(12) United States Patent
Avner et al.

(10) Patent No.: US 11,585,054 B2
(45) Date of Patent: Feb. 21, 2023

(54) HATCHES OF NACELLE AND HELICOPTER HOISTING PLATFORM

(71) Applicant: ADWEN GMBH, Bremerhaven (DE)

(72) Inventors: Dror Avner, Berlin (DE); Elmar Taubenrauch, Wurster Nordseeküste (DE)

(73) Assignee: ADWEN GMBH, Bremerhaven (DE)

( * ) Notice: Subject to any disclaimer, the term of this patent is extended or adjusted under 35 U.S.C. 154(b) by 715 days.

(21) Appl. No.: 16/490,630

(22) PCT Filed: Mar. 7, 2018

(86) PCT No.: PCT/EP2018/055662
§ 371 (c)(1),
(2) Date: Sep. 3, 2019

(87) PCT Pub. No.: WO2018/162589
PCT Pub. Date: Sep. 13, 2018

(65) Prior Publication Data
US 2020/0002908 A1    Jan. 2, 2020

(30) Foreign Application Priority Data

Mar. 7, 2017  (EP) .................................... 17159689

(51) Int. Cl.
*F03D 13/25* (2016.01)
*E01F 3/00* (2006.01)
(Continued)

(52) U.S. Cl.
CPC .............. *E01F 3/00* (2013.01); *B60P 1/5423* (2013.01); *B60P 1/5457* (2013.01); *F03D 13/25* (2016.05);
(Continued)

(58) Field of Classification Search
None
See application file for complete search history.

(56) References Cited

U.S. PATENT DOCUMENTS

2011/0316278 A1    12/2011   Siegfriedsen
2012/0282095 A1*   11/2012   Munk-Hansen ........ F03D 80/60
                                                        416/95
(Continued)

FOREIGN PATENT DOCUMENTS

DE    102013101239 A1    8/2014
EP         2466129 A2    6/2012
(Continued)

OTHER PUBLICATIONS

Extended European Search Report dated Aug. 28, 2017 for Application No. 17159689.3.
(Continued)

*Primary Examiner* — Michael Lebentritt
(74) *Attorney, Agent, or Firm* — Schmeiser, Olsen & Watts LLP

(57) ABSTRACT

The invention relates to a wind driven power plant comprising a nacelle having a nacelle cover and a helicopter hoisting platform, the nacelle further comprising a hatch extension and a hatch cover, the hatch extension being arranged between the nacelle cover and the hatch cover, wherein the hatch extension has a channel-like shape, wherein the hatch cover is mounted on top of the hatch extension, and wherein a the hatch extension provides a distance between the hatch cover and the nacelle cover.

10 Claims, 7 Drawing Sheets

(51) Int. Cl.
*F03D 80/50* (2016.01)
*B60P 1/54* (2006.01)

(52) U.S. Cl.
CPC .......... *F03D 80/50* (2016.05); *F05B 2240/14* (2013.01); *F05B 2240/90* (2013.01); *F05B 2240/911* (2013.01); *F05B 2240/916* (2013.01); *F05B 2280/6003* (2013.01)

(56) References Cited

U.S. PATENT DOCUMENTS

| | | | |
|---|---|---|---|
| 2013/0011272 A1* | 1/2013 | Mortensen | F03D 80/82 |
| | | | 416/244 R |
| 2014/0030111 A1* | 1/2014 | Kohne | E06B 9/0638 |
| | | | 416/244 R |
| 2017/0022966 A1* | 1/2017 | Therkildsen | F03D 80/88 |
| 2019/0072084 A1* | 3/2019 | Munk-Hansen | F03D 1/00 |
| 2020/0011302 A1* | 1/2020 | Taubenrauch | F03D 80/50 |
| 2020/0018292 A1* | 1/2020 | Taubenrauch | F03D 80/00 |
| 2020/0072184 A1* | 3/2020 | Taubenrauch | F03D 1/00 |
| 2022/0042491 A1* | 2/2022 | Takayanagi | E01F 3/00 |

FOREIGN PATENT DOCUMENTS

| | | |
|---|---|---|
| KR | 20150049048 A | 5/2015 |
| WO | 2015032400 A1 | 3/2015 |
| WO | WO 2015032400 A1 | 3/2015 |

OTHER PUBLICATIONS

International Search Report and Written Opinion dated Jun. 5, 2018 for Application No. PCT/EP2018/055662.

\* cited by examiner

HATCHES OF NACELLE AND HELICOPTER HOISTING PLATFORM

CROSS-REFERENCE TO RELATED APPLICATIONS

This application claims priority to PCT Application No. PCT/EP2018/055662, having a filing date of Mar. 7, 2018, which is based on European Application No. 17159689.3, having a filing date of Mar. 7, 2017, the entire contents both of which are hereby incorporated by reference.

FIELD OF TECHNOLOGY

The following relates to hatches of a nacelle of a wind turbine.

BACKGROUND

Wind is one of the most important renewable energy technologies. Wind turbines (also referred to as a wind driven power plants, wind turbine generators, or wind energy converters) are more and more arranged in large-scale offshore wind parks. There are many technical challenges relating to these offshore wind parks, as for example the assembly of parts and the transport, the erection of the wind turbine in the sea and the maintenance of the wind turbines.

In wind driven power plants hatches are used to provide access to the interior space of the nacelle. According to the known art, the hatches are positioned below the helicopter hoisting platform. The opening mechanism of the hatch covers is conventionally realized by a nonstandard sliding mechanism, whereas the hatch cover is slid beneath the helicopter hoisting platform. The helicopter hoisting platform girder height needs to be sufficient to allow the sliding mechanism to be located beneath the helicopter hoisting platform. In order to gain access to the hatch beneath the helicopter hoisting platform a grating element of the helicopter hoisting platform needs to be removed.

SUMMARY

An aspect relates to an easier and improved access to hatches of a nacelle for a wind driven power plant.

According to an aspect, an improved nacelle for a wind driven power plant is provided. The wind driven power plant comprises a nacelle having a nacelle cover and a helicopter hoisting platform. The nacelle further comprises a hatch extension and a hatch cover. The hatch extension is arranged between the nacelle cover and the hatch cover. The hatch extension can have a channel-like shape. In other words, the hatch extension is generally formed like a tunnel or tube having a first open end (lower end/side) and a second open end (upper end or top end/side). The second open end is to be covered, closed and sealed by a corresponding hatch cover. The hatch cover is mounted on the top end/side of the hatch extension. The hatch extension provides a distance between the hatch cover and the nacelle cover. The hatch extension is configured to adjust a level of the hatch cover to a desired level having a specific distance to the nacelle cover.

According to another aspect, a length of the hatch extension can be dimensioned such that a top surface of the hatch cover is substantially flush with a surface of a winching area of the helicopter hoisting platform. A height difference between the surface of the winching area of the helicopter hoisting platform and the top surface of the hatch cover can be avoided. This simplifies the usage of the hatch cover.

According to another aspect, the hatch cover can be configured to serve as a part of the winching area of the helicopter hoisting platform. The hatch cover can also be configured as an integrated part of the winching area of the helicopter hoisting platform. The top surface can be a valid walkable surface. The top surface of the hatch cover can be a part of the walkable surface of the winching area of the helicopter hoisting platform. In other words, the top surface of the hatch cover can firstly be flush with the walkable surface of the winching area and can secondly be located in the restricted area of the winching area determined by the handrail of the helicopter hoisting platform. According to this aspect, access to the hatch cover of the hatch is advantageously possible without leaving the winching area (the protected area) of the helicopter hoisting platform and without (partially) removing the walkable surface of the winching area. The integration of the hatch into the restricted area of the helicopter hoisting platform, i.e. the winching area allows the helicopter hoisting platform to be advantageously designed with the minimum allowed dimensions of 4×4 square meters.

There are nacelles according to known art which comprise a helicopter hoisting platform with a winching area integrated into the nacelle cover. For these known art solutions an integration of a hatch into the winching area is easily implementable. In contrast, for the present nacelle the helicopter hoisting platform and the winching area can be non-integrated into the nacelle cover in order to allow the nacelle cover to be configured in an advantageous manner. By not-integrating the helicopter hoisting platform into the nacelle cover, the nacelle cover can advantageously be configured with a small number of supporting structures connecting the nacelle cover to the support frame of the nacelle. Although the helicopter hoisting platform and the winching area can be non-integrated into the nacelle cover, a hatch providing access to an interior space of the nacelle can be integrated into the winching area of the helicopter hoisting platform by means of a hatch extension, according to aspects of embodiments of the invention. In other words, the benefits of a separated nacelle cover can be combined with the benefits of a hatch integrated into the winching area.

According to another aspect the hatch extension and the hatch cover can be floating with respect to the winching area of the helicopter hoisting platform. Although the hatch is integrated into the winching area and although the top surface of the hatch cover is a part of the walkable surface of the winching area, the hatch cover and the winching area can encompass a small slit. The slit can be configured such that the walkability of the top surface of the hatch cover and the winching area is not disadvantageously affected. The slit can be configured such that the hatch and the hatch cover as well as the winching area of the helicopter hoisting platform can independently vibrate or expand/shrink from each other dependent on vibrations or temperature variations.

According to another aspect, the nacelle further comprises a provision flange around an opening in the nacelle cover. The hatch extension can be configured as an adapter having an adapter flange. The adapter flange of the adapter can be coupled to the provision flange projecting from the nacelle cover around the opening inside the nacelle cover. The adapter can extend the opening in the nacelle cover. The hatch cover can be mounted on top of the adapter. Different levels of the hatch cover are advantageously realizable by a hatch extension configured as an adapter which extends an opening inside the nacelle cover.

According to another aspect, the hatch cover can be configured to be opened so as to allow entrance to an interior space of the nacelle. Advantageously, the interior space of the nacelle is accessible in an easy and convenient manner without the need for dismounting the nacelle cover. The hatch cover can comprise linear actuators or gas springs which can be configured to keep the hatch cover in specific positions, e.g. in an opened position.

According to another aspect, the hatch cover can be configured to be opened from an interior space of the nacelle and from an exterior space of the nacelle, respectively. For a hatch cover which can be opened from an interior and an exterior space of the nacelle, the usability is advantageously improved compared to a hatch cover which can only be opened from one side.

According to another aspect, the hatch extension can be made of a composite, in particular a fiber reinforced polymer.

According to another aspect, the nacelle cover can comprise and/or can be built of a plurality of panels which are made of a composite, in particular a fiber reinforced polymer.

The panels of the nacelle cover and the hatch extension can advantageously be made of a composite, in particular a fiber reinforced polymer. The fiber reinforced polymer can be a glass fiber reinforced polymer (GFRP). A glass fiber reinforced polymer, also known as "Fiberglass" or "fiberglass" is a type of fiber-reinforced plastic where the reinforcement fiber is specifically glass fiber. The fibers may be randomly arranged and flattened into a sheet (called a chopped strand mat), or woven into a fabric. Alternatively, the fibers of a layer of the composite may be unidirectionally aligned. The polymer matrix may be a thermoset polymer matrix, most often based on thermosetting polymers such as epoxy, polyester resin, or vinylester, or a thermoplastic. Glass fibers are made of various types of glass depending upon the fiberglass use. These glasses all contain silica or silicate, with varying amounts of oxides of calcium, magnesium, and sometimes boron. Other common names for fiberglass are glass-reinforced plastic (GRP), glass-fiber reinforced plastic (GFRP) or GFK (from German: Glasfaserverstärkter Kunststoff). Because glass fiber itself is sometimes referred to as "fiberglass", the composite is also called "fiberglass reinforced plastic." The present description also uses the term "composite" for GFRP or GRP.

According to another aspect, the hatch extension can be configured as an integral part of the nacelle cover. In particular, the hatch extension can be configured as an integral part of a panel of the nacelle cover. This configuration advantageously avoids an additional flange connection which would be needed if the hatch extension is no integral part of the nacelle cover or a panel of the nacelle cover.

According to another aspect the top surface of the hatch cover can comprise an anti-slide-plating. This advantageously reduces hazards caused by slipping on the hatch cover, e.g. due to rain or snow.

According to another aspect, the wind driven power plant can comprise a plurality of hatch extensions. These hatch extensions can be positioned in a rear part of a roof of the nacelle. A plurality of hatch extensions advantageously allows the nacelle to be accessed at different locations.

According to another aspect, the wind driven power plant can comprise hatches and corresponding hatch extensions wherein a first hatch and hatch extension has a first maximum diameter and a second hatch and hatch extension has a second maximum diameter. The first maximum diameter is greater than the second maximum diameter. Individual hatch extensions with different dimensions can advantageously be used for different purposes. In particular, the larger hatch and hatch extension can have a maximum diameter of at least 2 meters. The larger hatch and hatch extension may have a substantially rectangular cross-sectional area. The larger hatch and hatch extension may serve to provide a rather flat (not too steep) access to the interior space of the nacelle.

According to another aspect the hatch and the corresponding hatch extension can be configured to provide access to a stairway in order to provide an easy and convenient entrance into the interior space of the nacelle. The stairway can advantageously be a 45° stairway being configured according to engineer standards for conventional and ergonomic stairway designs. The hatch extension can advantageously be configured such that the winching area represents the top step of the stairway if the hatch cover is opened. The hatch and the corresponding hatch extension can advantageously have a first diameter of approximately 3050 mm and a second diameter of approximately 850 mm.

According to another aspect, the panels and the hatch extension can be connected to each other by means of overlapping flanges, which are integral to the panels and the hatch extension, i.e. the provision flange and the adapter flange. The flanges advantageously extend in the same plane as the panel or the hatch extension to which they belong. Flanges of curved panels or hatch extensions may accordingly extend in a direction substantially tangential to the curve, i.e. continue in the direction of (overall) extension in the region of the panel or hatch extension adjacent to the flange. In other words, the respective flange extends straightly (not bent or curved) from the panel or hatch extension.

Advantageously, the arrangement of the flanges (and the panels/hatch extensions) can be based on a high-point drainage concept. Accordingly, the flange of a higher panel/hatch extension overlaps the flange of a lower complementary hatch extension/panel of a flange connection on an outer side of the nacelle cover in a downward direction. This aspect exploits gravitational forces such that a water flow (e.g. caused by rain) is directed away from the split line (of the flange connection).

Advantageously, the flange connection can comprise reinforcing angular ("L"-shaped) beams or similar profiled metal beams, which can be arranged along the flanges, thereby becoming a part of the flange connection. The reinforced flange connection allows for a simple and robust construction of the nacelle cover.

According to another advantageous aspect, the nacelle cover comprises at least two different flange connections, dependent on the fitting conditions and whether the flange connections are configured to be detachable flange connections or permanent flange connections. A first flange connection may comprise a rivet/clinch nut and a bolt. A second flange connection may comprise a clinch bolt and a normal nut. A first flange connection may comprise two metal bars on opposite sides of the flanges. A second flange connection may comprise only one metal bar on one side of the flange connection.

The metal bars can be arranged and conductively interconnected such that they form a faraday cage to provide a lightning protection of the drive train and other components.

The flange connections may be configured to constitute a substantially maintenance free connection, having an expected/calculated lifetime of approximately twenty-five years.

The configuration of the flange connections and their location and orientation around the nacelle cover as well as the configuration of the panels and the hatch extensions provides that the nacelle cover is more/better self-supporting, i.e. requires less connection points (brackets) to the support frame than known art solutions. According to another advantageous aspect, at least one panel may comprise a sandwich structure having a foam core.

Further, at least one panel of the self-supported nacelle roof can be reinforced by at least one rib. Advantageously, the rib can be an integral part of the panel. There may be a plurality of ribs located in the panels of the nacelle roof. The panels comprising the ribs may be formed in a sandwich construction comprising a core of foam. Advantageously, the nacelle roof can thereby be configured to sustain snow loads (highest load on the roof), live loads load (e.g. from maintenance work) and fall arrest loads.

Advantageously, the panels are configured to comprise an enveloping cuboid that fits into standardized freight containers.

According to another aspect, the hatch extension and the hatch cover can be configured to close and seal the nacelle in a water and air tight manner if the hatch cover is closed. The hatch cover and/or the hatch extension can comprise a sealing. This sealing can provide water and air tightness of the nacelle if the hatch cover is closed. The interior space of the nacelle can advantageously be protected against exterior environmental influences if the hatch cover is closed.

The following also provides a wind park comprising a plurality of wind driven power plants comprising the hatch extension according to the aspects and embodiments of the invention.

BRIEF DESCRIPTION

Some of the embodiments will be described in detail, with references to the following Figures, wherein like designations denote like members, wherein.

DETAILED DESCRIPTION

Figure 1:
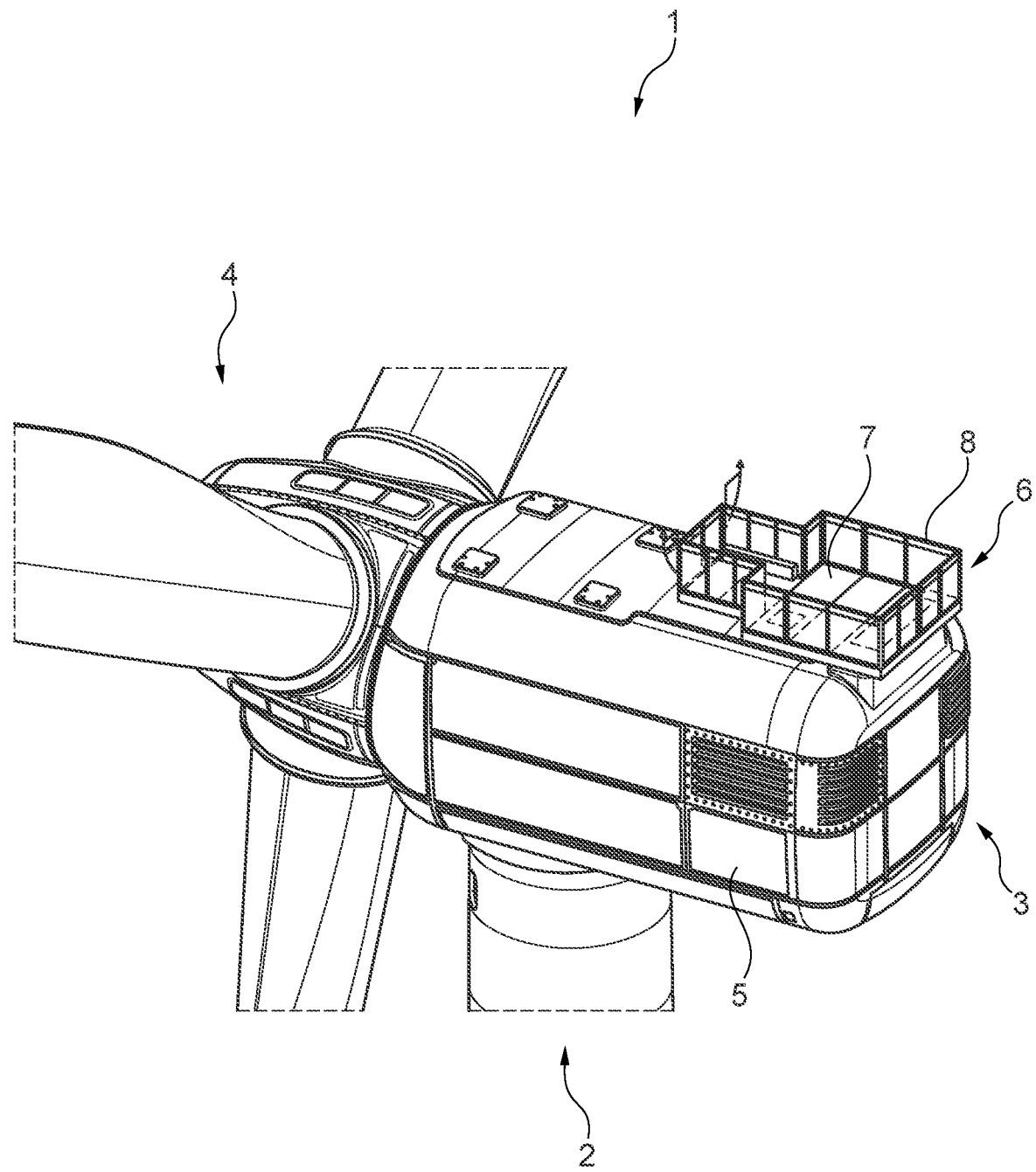
FIG. 1 is a simplified perspective view of a wind turbine.

FIG. 1 is a simplified perspective view of a wind turbine or wind driven power plant 1. The wind driven power plant 1 comprises a tower 2, a nacelle 3, and a rotor 4. The nacelle 3 extends in a vertical direction, which is substantially parallel to the axial extension of a supporting structure, in particular a tower 2 on which the nacelle 3 can be mounted. The nacelle 3 comprises a nacelle cover 5 and a helicopter hoisting platform 6 which comprises further a winching area 7 and a handrail 8.

Figure 2:
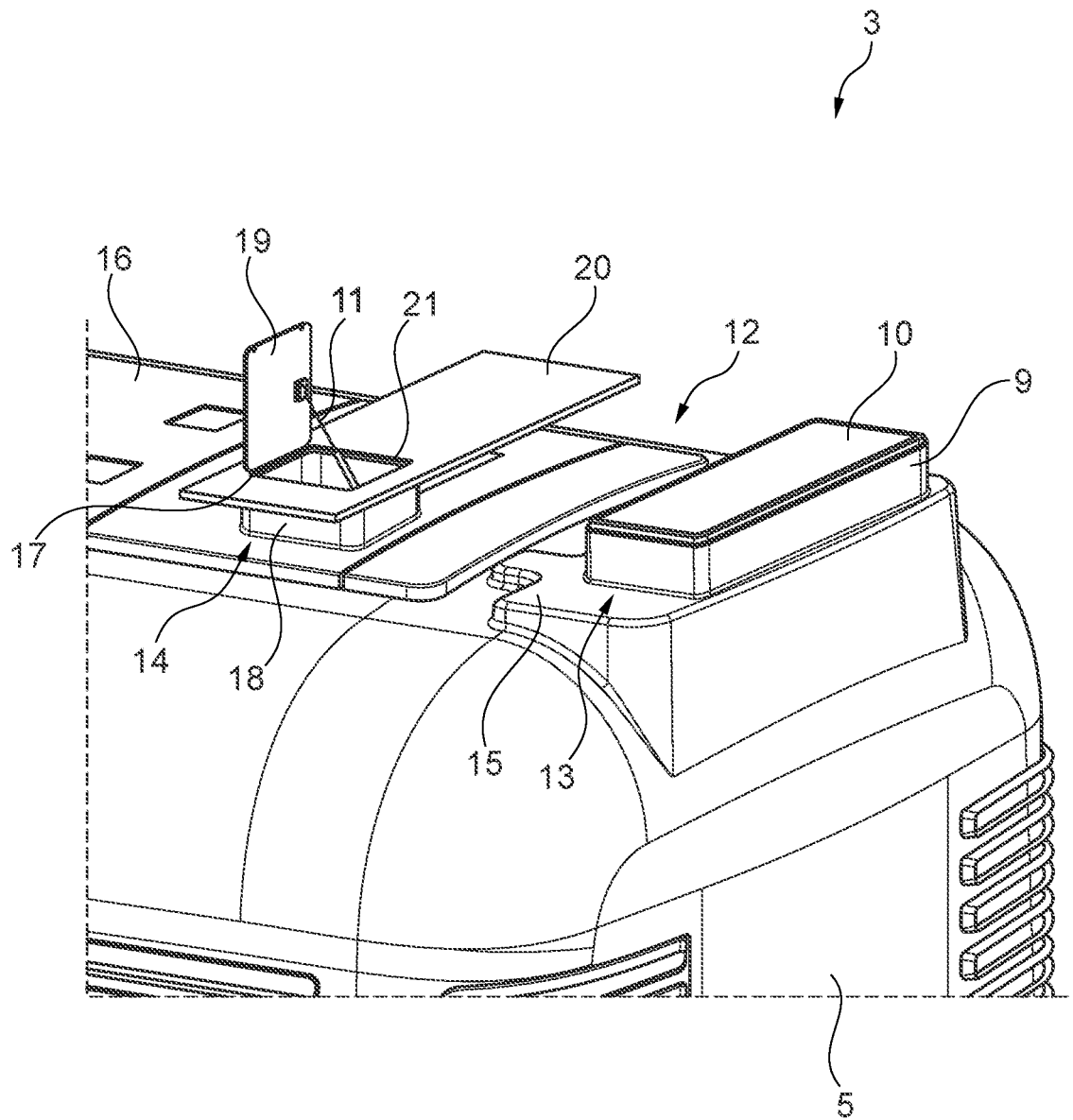
FIG. 2 is a simplified perspective view of two separate hatches which are positioned in the rear part of the roof of the nacelle.

FIG. 2 is a simplified perspective view of two separate hatches 13, 14 which are positioned in the rear part of the roof 12 of the nacelle 3.

For the present embodiment, the roof 12 is divided into separate sections 15, 16. However, the roof may also be a one-piece-element. The hatches 13, 14 comprise in general a similar setup, except that the sizes of the hatches 13, 14 are different from each other for the present embodiment. The details of the hatches will be explained referring to the one or the other hatch but they are valid correspondingly.

The hatch 13 comprises a hatch extension 9 and a hatch cover 10. The hatch extension 9 is mounted to the roof section 15. The hatch extension 9 has a channel-like shape with two open ends. At the top end the hatch cover is mounted to the hatch extension 9. The lower end of the channel-like hatch extension 9 coincides with an opening (not shown in FIG. 2) inside the roof section 15. The hatch extension 9 provides a distance between the roof section 15 of the nacelle cover and the hatch cover 10.

The hatch 14 comprises a hatch extension 18 and a hatch cover 17. The hatch extension 18 is mounted to a different roof section 16. The hatch is shown in opened position. The hatch cover 19 is mounted by means of hinges 17 to the hatch extension 18. The hatch cover 19 is additionally equipped with a linear drive 11 which is configured to keep the hatch cover 19 in specific positions, e.g. in an opened position.

The winching area of the helicopter hoisting platform is indicated in FIG. 2 by a single winching area element 20. The winching area element 20 comprises a cut-out 21. The hatch 14 is configured to fit this cut-out 21 with respect to two aspects. Firstly, the hatch cover 19 is configured to substantially fit the cut-out 21 of the winching area element 20 with respect to the dimensions within the top surface of the winching area element 20. Secondly, the length of the hatch extension 18 is configured such, that the top surface of the hatch cover 19 is substantially flush with the top surface of the winching area element 20 if the hatch cover 19 is in closed position. If the hatch cover 19 is in closed position, there is no significant gap between the top surface of the hatch cover 19 and the top surface of the winching area element 20 with respect to both lateral and vertical distances.

Figure 3:
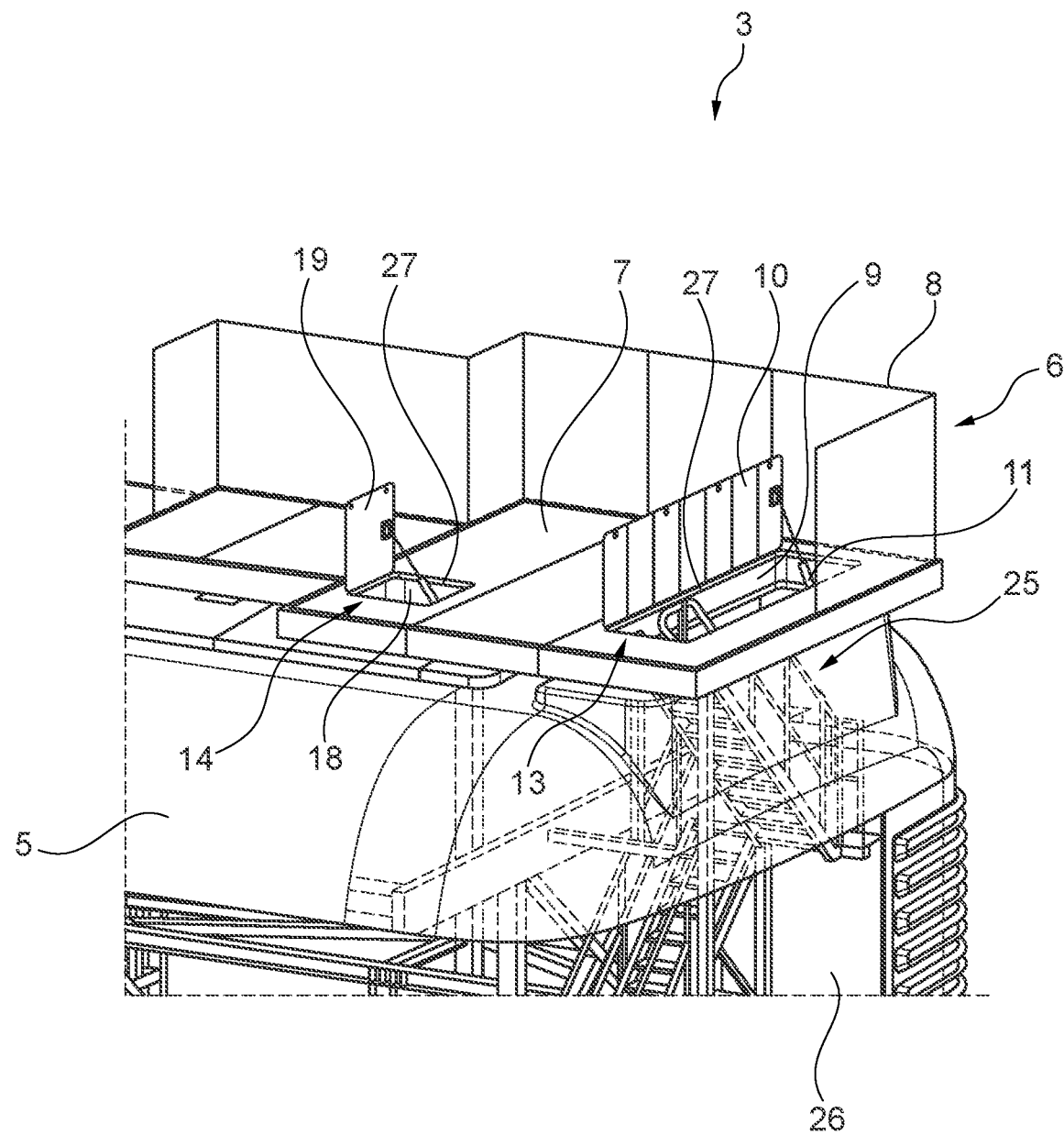
FIG. 3 is a simplified perspective view of two separate hatches and the helicopter hoisting platform with a partially skipped handrail and a partially skipped nacelle cover.

FIG. 3 is a simplified perspective view of two separate hatches 13, 14 and the winching area 7 of the helicopter hoisting platform 6 with a partially skipped handrail 8 and a partially skipped nacelle cover 5.

The hatch covers 10, 19 are integrated parts of the winching area 7 of the helicopter hoisting platform 6. The hatch covers 10, 19 are valid walkable surfaces proceeding the walkable surface of the winching area 7 of the helicopter hoisting platform 6. To reduce hazards of slipping the top surfaces of the hatch covers 10, 19 are equipped with an anti-slide-plating. Although the hatch covers 10, 19 are integrated parts of the winching area 7, the winching area 7 and the helicopter hoisting platform 6 are floating with respect to the hatches 13, 14. That means there are small slits between the hatch covers 10, 19 and the winching area 7. These slits are so small that they do not disadvantageously influence the walkability of the winching area 7 and the hatch covers 10, 19. The floating aspect allows the hatches 13, 14 and the helicopter hoisting platform 6 to be decoupled from each other. The hatches 13, 14 and the helicopter hoisting platform 6 may independently vibrate or expand/shrink from each other dependent on vibrations or temperature variations. The hatches 13, 14 allow access to the interior space 26 of the nacelle 3. The hatches 13, 14 comprise different dimensions because they serve different functions. For instance, the hatch 13 is configured to provide access to a stairway 25 as an entrance to the interior space 26 of the nacelle 3. The integration of the hatch covers 10, 19 into the winching area 7 allows access to the interior space 26 of the nacelle 3 without the need for leaving the restricted area (secured area) of the helicopter hoisting platform 6 determined by the handrail 8.

Between the hatch extensions 9, 18 and the hatch covers 10, 19 a sealing 27 is provided. The sealing is configured to seal the interior space 26 of the nacelle 3 with respect to water and air if the hatch covers 10, 19 are in closed positions. When the hatch covers 10, 19 are in closed positions, the nacelle is protected against environmental influences.

The hatch covers 10, 19 can not only be opened from the winching area 7, i.e. from an exterior space of the nacelle, but also from the interior space 26 of the nacelle 3. This means a person can open the hatch cover 10, enter the interior space 26 of the nacelle 3, close the hatch cover 10 in order to protect the interior space 26 against environmental influences, and then open the hatch cover 10 again in order to leave the nacelle 3.

Figure 4:
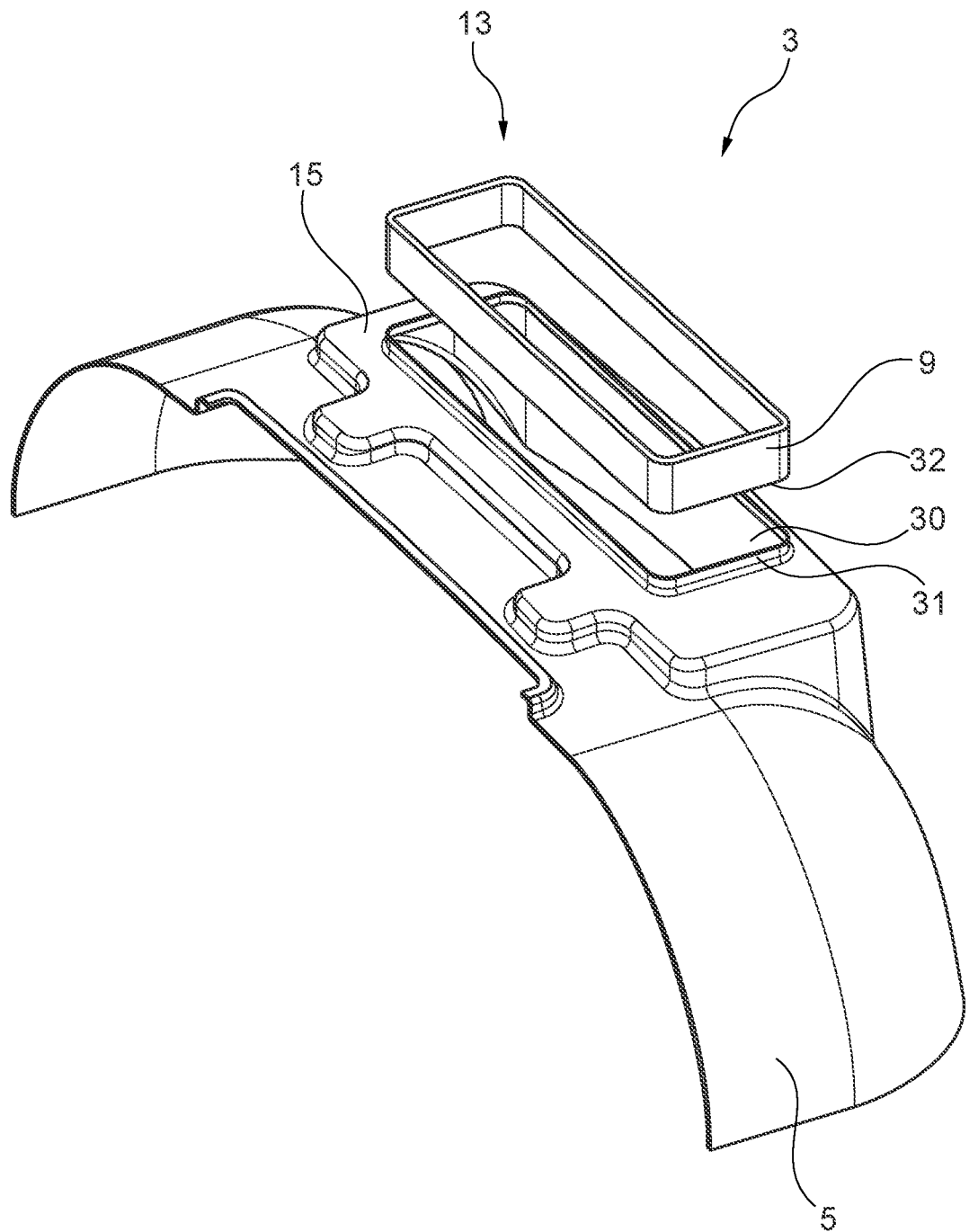
FIG. 4 is a simplified view on an exploded view of a part of the roof of the nacelle and a hatch extension.

FIG. 4 is a simplified view on an exploded view of a roof section 15 of the nacelle 3 and a hatch extension 9. The hatch 13 is only partially represented by the hatch extension 9 while the hatch cover of the hatch 13 is not shown. The roof section 15 comprises an opening 30 and a provision flange 31 which surrounds the opening 30. The provision flange 31 is integral to the roof section 15 of the nacelle cover 5. The hatch extension 9 is configured as an adapter which comprises an adapter flange 32 at the lower end of its channel-like shape. The adapter flange 32 is integral to the hatch extension 9. The hatch extension 9 is configured to be mounted by joining the provision flange 31 of the roof section 15 of the nacelle cover 5 with the adapter flange 32 of the hatch extension 9. In this and other embodiments and for the aspects of embodiments of the invention, the provision flange 31 and the adapter flange 32 correspond to each other so as to form a common flange connection.

The flanges of the provision flange 31 and the adapter flange 31 overlap each other in the same plane as the hatch extension 9 or roof section 15 to which they belong. This configuration is referred to as planar overlapping flange connection.

The nacelle cover 5 can also comprise a plurality of panels. The provision flange 31 can then be integral to one of the panels of the nacelle cover 5.

The hatch extension 9 can be integral to the nacelle cover 5 or one of the panels of the nacelle cover 5. The planar overlapping flange connection between the provision flange 31 and the adapter flange 32 of the hatch extension 9 would then be avoided.

Figure 5:
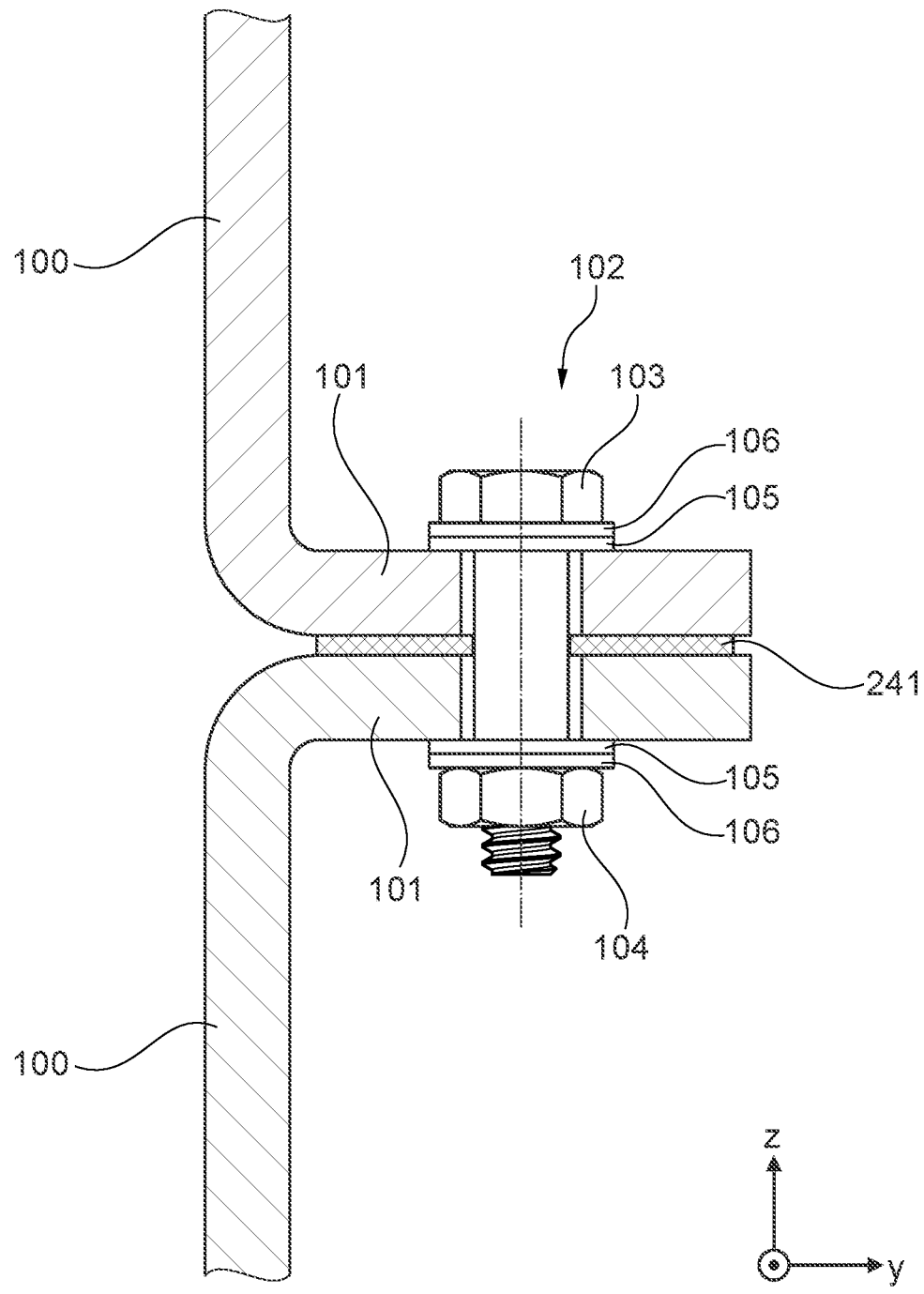
FIG. 5 is a simplified cross-sectional view of a flange connection of two nacelle cover panels.

FIG. 5 shows a simplified cross-sectional view of a flange connection of two nacelle cover panels 100, according to the known art. Flanges 101 extend perpendicularly from the panels 100. The flanges 101 are connected by a bolted (screwed) connection 102 on the inside of the nacelle. This provides that the bolt 103 and the nut 104 are both accessible from inside the nacelle. The bolted connection may comprise additional washers 105 (i.e. optional elastomeric washers for sealing and/or spring washers) and metallic washers 106. Advantageously, due to the configuration of the flanges 101, the bolted assembly 102 on the inside of the nacelle is well protected from environmental effects outside the nacelle.

Figure 6:
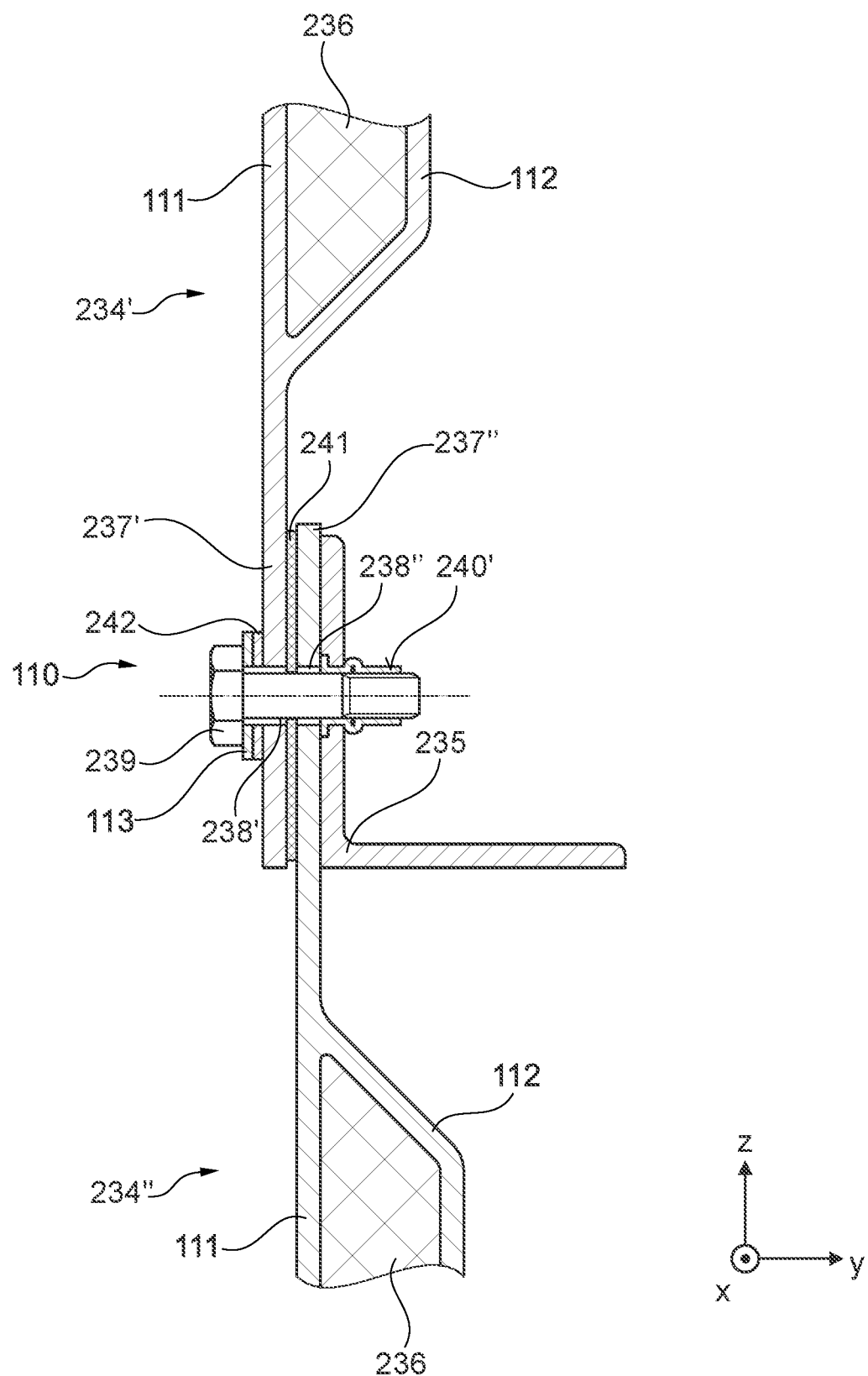
FIG. 6 is a simplified cross-sectional view of a flange connection of two overlapping panels.

FIG. 6 shows a simplified perspective cross-sectional view of an exemplary flange connection 110 of two overlapping nacelle cover panels 234 according to an aspect of embodiments of the invention. The nacelle panels 234 are made of a composite, in particular a glass fiber reinforced polymer (GFRP). This type of overlapping flange connection may also be applied to the overlapping flanges of provision and adapter flange of the nacelle cover and the hatch extension.

Each composite panel (including each hatch extension) 234 is manufactured as a wide span self-support composite panel. The panel 234 is configured as a typical sandwich lamination. Each panel 234 comprises an outer side fiberglass layer 111 and an inner side fiberglass layer 112. The panels 234 can optionally comprise a middle foam core 236 in-between the outer side fiberglass layer 111 and the inner side fiberglass layer 112. The foam core 236 can be configured to form reinforcement ribs in the panel 234. Alternatively, the foam core 236 can be a global foam core 236, i.e. spanning a major part of the panel 234. The foam cores 236 are covered by the outer side and inner side fiberglass layers 111, 112 and enhance the stability of the panel 234.

Resin infusion is utilized during the lamination process. In a one-shot resin infusion process, the resin is distributed in a uniform manner across the layup. Subsequently, bonding/curing the complete layup can be conducted, e.g. in an autoclave. Accordingly, a majority or all the composite panels (including the hatch extensions) of the nacelle 3 are manufactured in a one-shot lamination/manufacturing step.

The panels (including each hatch extension) 234 are connected to each other by means of overlapping flanges 237. Each of the flanges 237 is integral to one of the panels or the hatch extension 234. The flanges 237 advantageously extend in the same plane as the panel 234 to which it belongs or at least in substantially the same plane as the region of the panel 234 adjacent to the flange 237. In other words, the respective flange 237 extends essentially straightly (not bent or curved) from the adjacent region of the panel or hatch extension 234.

The arrangement of the panels (including each hatch extension) of the nacelle cover in general, and in particular of the overlapping flanges 237, is based on a high-point drainage concept. This means that the flange 237' of the top panel (including each hatch extension) 234' of a flange connection 110 having a higher level (greater altitude; greater height) spans/overlaps the flange 237" of the complementary bottom panel (including each hatch extension) 234" (the bottom panel 234" having a lower level) on an outer surface of the nacelle 3 in a downward direction. Hence, the arrangement of the overlapping flanges 237', 237" advantageously exploits gravitational forces which determine the water flow direction in order to keep water from flowing into the nacelle 3.

The drillings 238 (drill holes) for the flange connection 110 are applied after the manufacturing process of the composite panels (including each hatch extension) 234, i.e. after curing and/or autoclaving the panels 234, and after the respective panels or hatch extensions 234', 234" are adjusted to each other. With this procedure, the accuracy of fit of corresponding drillings 238', 238" in the flanges 237 of both respective panels 234 is advantageously ensured.

According to an aspect, specialized threaded bolts 239 and nuts 240 are used. Either a (clinch) bolt 239' or a (clinch/rivet) nut 240' is pressed (clinched, riveted) into a reinforcing metal beam 235 that is part of the flange connection 110. Given this procedure, the attached threaded bolt 239' or nut 240' is fixed in position and is not rotatable. The complementary nut 240 or bolt 239 used to tighten the connection joint can accordingly be applied from the inside or the outside of the nacelle 3, depending on the configuration (the flange connection 110 being a permanent connection or a detachable connection). Generally, a detachable flange connection should be accessible at least from inside the nacelle 3. No access to the joint is necessary from the outside which advantageously decreases the risk during assembling or maintaining the nacelle 3. A permanent flange connection 110 may be operated (loosened/disengaged, tightened/engaged) from inside or the outside the nacelle 3, depending on accessibility of the flange connection.

In this embodiment, a rivet nut 240' is riveted to the metal bar 235 on the inside. The bolt 239 is screwed into the rivet nut 240' from the outside.

The flange connection 110 is reinforced by profiled metal bars 235 (metal beams), which can be arranged adjacent to the flanges 237 (and extending along the split line), thereby becoming a part of the flange connection 110. The metal bars 235 can, for example, exhibit a flat bar shape and/or an "L"-shape (as shown). The metal bars 235 are mounted to the connection joints to stabilize the flange connection. Furthermore, the "L"-shaped metal bars 235 are further used and configured to mount the composite panels 234 to the lateral sections of the framework structure of the support frame. Adjustable brackets can be coupled to the L-shaped or angular metal bars 235 and the support frame, i.e. the beams or truss members of the support frame.

The metal bars 235 can be arranged and conductively interconnected such that they form a faraday cage to provide a lightning protection of the drive train and other components.

Between the panels 234 a sealing 241 is applied and provides water and air tightness of the flange connection 110. Water and air tightness generally refers to a liquid/fluid ingress protection under environmental conditions the nacelle 3 is exposed to. Moreover, sealing paste can be used to tighten the drill holes 238', 238" with respect to water and air. A liquid bolt retaining compound (also: liquid screw retention or liquid screw locking) can protect the screwed connection of the bolt 239 and the nut 240 against undesired loosening. An elastomeric (rubber/silicone) washer 242 is applied between a steel washer 113 and the flange 237.

The flange connection 110 is configured to be a substantially maintenance free connection, having an expected/calculated lifetime of approximately twenty-five years.

In short, the flange connection 110 comprises (from outside to inside of the nacelle 3) a bolt 239 extending through a metal washer 113, an elastomeric washer 242, a drill hole 238' in the outer/top panel 234', an elastomeric sealing 241, a drill hole 238" in the inner/bottom panel 234", and a rivet nut 240' riveted into a hole of a profiled metal bar 235. The bolt 239 is screwed into the rivet nut 240' from the outside.

The concept of planar flange connections 110 in combination with the high-point drainage concept has surprisingly proven to be more robust and easier to maintain than the known art flange connections 100.

Figure 7:
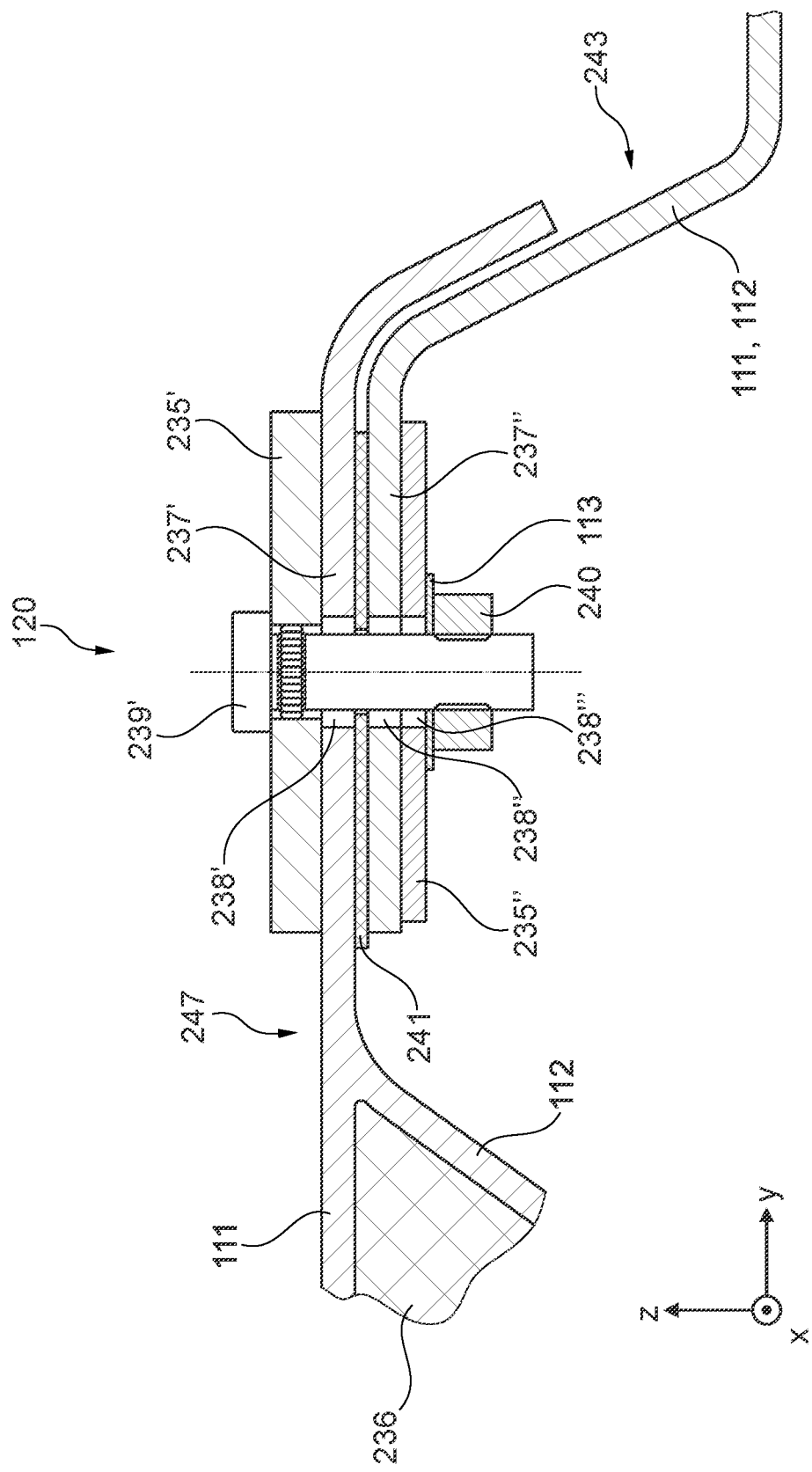
FIG. 7 is a simplified cross-sectional view of a flange connection of an inner roof panel overlapping an outer roof panel of the nacelle roof.

FIG. 7 shows a simplified cross-sectional view of a flange connection 120 of an inner roof panel 247 overlapping an outer lateral roof panel 243 of the nacelle roof. The configuration/construction of the panels 234, more specifically the inner roof panels 247 and outer roof panels 243 is substantially comparable/similar to the panels 234 of the side 243 and rear walls 245 of the nacelle 3.

Each panel 247, 243 comprises an outer side fiberglass layer 111 and an inner side fiberglass layer 112. The panels 247, 243 can optionally comprise a middle foam core 236 in-between the outer side fiberglass layer 111 and the inner side fiberglass layer 112. The foam core 236 can be configured to form reinforcement ribs in the panels 247, 243. The ribs extend along the vertical direction Z and/or the transverse direction Y. Alternatively, the foam core 236 can be a global foam core 236, i.e. spanning over a major portion of the panel 247, 243. The foam cores 236 are covered by the outer side and inner side fiberglass layers 111, 112 and enhance the stability of the panels 247, 243.

The panels 247, 243 are connected to each other by means of overlapping flanges 237. Each of the flanges 237 is integral to one of the panels 247, 243. The flanges 237 advantageously extend in the same plane as the panel 247, 243 to which it belongs or at least in substantially the same plane as the region of the panel 247, 243 adjacent to the flange 237.

The arrangement of the panels of the nacelle cover in general, and in particular of the overlapping flanges 237, is based on the high-point drainage concept. This means that the flange 237' of the top panel 234' of a flange connection 120 having a higher level overlaps the flange 237" of the complementary bottom panel 234" on an outer surface of the nacelle 3 in a downward direction.

The drill holes 238 for the flange connection 120 are applied after the manufacturing process of the composite panels 243, 247.

A clinch bolt 239' having a straight-knurled press-fit collar below its head (or generally speaking under heads serrations) is pressed into a(n outer) reinforcing metal bar 235' that is part of the flange connection 120. The clinch bolt 239' is fixed to the metal bar 235' in a rotatably fixed manner.

A complementary nut 240 is used to tighten the flange connection 120.

The flange connection 120 is a detachable flange connection and can be detached from inside the nacelle 3.

The flange connection 120 is reinforced by profiled metal bars 235', 235" on the inside and the outside of the nacelle 3 adjacent to the top flange 237' and the bottom flange 237", respectively. The metal bars 235', 235" substantially sandwich the flanges 237', 237" of the panels 247, 243 in-between. The metal bars 235', 235" extend along the split line (the direction of extension of the flange connection 120 between panels). The metal bars 235', 235" are a part of the flange connection 120. The metal bars 235 can have a flat bar shape (as shown) or a "L"-shaped profile (not shown).

The metal bars 235 can be arranged and conductively interconnected such that they form a faraday cage to provide a lightning protection of the drive train and other components.

Between the panels 247, 243 a sealing 241 is applied and provides water and air tightness of the flange connection 120. Water and air tightness generally refers to a liquid/fluid ingress protection under environmental conditions the nacelle 3 is exposed to.

Moreover, sealing paste can be used to tighten the drill holes 238', 238" with respect to water and air. A liquid bolt retaining compound can protect the screwed connection of the (clinch) bolt 239' and the nut 240 against undesired loosening. The flange connection 120 further comprises a steel washer 113 (and/or spring washer) between the inside metal bar 235" and the nut 240.

The flange connection 120 is configured to be a substantially maintenance free connection, having an expected/calculated lifetime of approximately twenty-five years.

In short, the flange connection 120 comprises (from outside to inside of the nacelle 3) a bolt 239' pressed into (a hole in) the outside metal bar 235', and further extending through a drill hole 238' in the top flange 237' (of the inner roof panel 247), an elastomeric sealing 241, a drill hole 238" in the bottom flange 237", a hole in an inside metal bar 235" and a nut 240 screwed to the bolt 239' from the inside.

The concept of planar flange connections 120 in combination with the high-point drainage concept has surprisingly proven to be more robust and easier to maintain than the known art flange connections 100.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

Embodiments

A wind driven power plant comprising a nacelle having a nacelle cover and a helicopter hoisting platform, the nacelle further comprising a hatch extension and a hatch cover, the hatch extension being arranged between the nacelle cover and the hatch cover, wherein the hatch extension has a channel-like shape, wherein the hatch cover is mounted on top of the hatch extension, and wherein a the hatch extension provides a distance between the hatch cover and the nacelle cover.

The wind driven power plant of embodiment 1, wherein a length of the hatch extension is dimensioned such that a top surface of the hatch cover is substantially flush with a surface of a winching area of the helicopter hoisting platform.

The wind driven power plant of embodiment 1 or 2, wherein the hatch cover is configured to serve as a part of the winching area of the helicopter hoisting platform and/or the hatch cover forms an integrated part of the winching area of the helicopter hoisting platform.

The wind driven power plant of anyone of the preceding embodiments, wherein the nacelle further comprises a provision flange and an opening inside the nacelle cover, wherein the hatch extension is configured as an adapter having a flange to be coupled to the provision flange projecting from the nacelle cover around the opening so as to extend the opening, and wherein the hatch cover is mounted on top of the adapter.

The wind driven power plant of anyone of the preceding embodiments, wherein the hatch cover is configured to be opened so as to allow entrance to an interior space of the nacelle.

The wind power plant of anyone of the preceding embodiments, wherein the hatch cover is configured to be opened from an interior space and from an exterior space of the nacelle.

The wind driven power plant of anyone of the preceding embodiments, wherein the hatch extension is made of a composite.

The wind driven power plant of claim anyone of the preceding embodiments, wherein the nacelle cover comprises and/or is built of a plurality of panels which are made of a composite, in particular GFRP.

The wind driven power plant of anyone of the preceding embodiments, wherein the hatch extension is configured as an integral part of the nacelle cover, in particular as an integral part of a panel of the nacelle cover.

The wind driven power plant of anyone of the preceding embodiments, comprising a plurality of hatch extensions which are located at least in a rear part of a roof of the nacelle.

The wind driven power plant of embodiment 10, wherein a first hatch extension has a first maximum diameter and a second hatch extension has a second maximum diameter and the first diameter is greater than the second diameter.

A wind park comprising a plurality of wind driven power plants according to anyone of the preceding embodiments.

The invention claimed is:

1. A wind driven power plant comprising:
a nacelle having a nacelle cover comprising a roof section and a helicopter hoisting platform, the nacelle further comprising a hatch extension and a hatch cover in the roof section, the hatch extension being arranged between the nacelle cover and the hatch cover, the hatch extension having a channel-like shape, the hatch cover being mounted on top of the hatch extension, and the hatch extension providing a distance between the hatch cover and the nacelle cover,
wherein the roof section of the nacelle cover comprises a provision flange and an opening inside the nacelle cover,
wherein the hatch extension is configured as an integral part of the roof section of the nacelle cover projecting from the nacelle cover around the opening so as to extend the opening, and
wherein the hatch extension is configured as an integral part of a panel of the roof section of the nacelle cover.

2. The wind driven power plant of claim 1, wherein a length of the hatch extension is dimensioned such that a top surface of the hatch cover is substantially flush with a surface of a winching area of the helicopter hoisting platform.

3. The wind driven power plant of claim 2, wherein the hatch cover is configured to serve as a part of the winching area of the helicopter hoisting platform and/or the hatch cover forms an integrated part of the winching area of the helicopter hoisting platform.

4. The wind driven power plant of claim 1, wherein the hatch cover is configured to be opened so as to allow entrance to an interior space of the nacelle.

5. The wind power plant of claim 1, wherein the hatch cover is configured to be opened from an interior space and from an exterior space of the nacelle.

6. The wind driven power plant of claim 1, wherein the hatch extension is made of a composite.

7. The wind driven power plant of claim 1, wherein the nacelle cover comprises and/or is built of a plurality of panels which are made of a composite, the composite being glass fiber reinforced plastics (GFRP).

8. The wind driven power plant of claim 1, comprising a plurality of hatch extensions which are located at least in a rear part of a roof of the nacelle.

9. The wind driven power plant of claim 8, wherein a first hatch extension has a first maximum diameter and a second hatch extension has a second maximum diameter and the first diameter is greater than the second diameter.

10. A wind park comprising a plurality of wind driven power plants according to claim 1.

* * * * *